(12) United States Patent
Phielipp et al.

(10) Patent No.: US 8,630,963 B2
(45) Date of Patent: Jan. 14, 2014

(54) AUTOMATIC USER IDENTIFICATION FROM BUTTON PRESSES RECORDED IN A FEATURE VECTOR

(75) Inventors: Mariano J. Phielipp, Mesa, AZ (US); Magdiel F. Galán, Gilbert, AZ (US); Branislav Kveton, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 289 days.

(21) Appl. No.: 13/175,603

(22) Filed: Jul. 1, 2011

(65) Prior Publication Data

US 2013/0006898 A1 Jan. 3, 2013

(51) Int. Cl.
- *G06F 15/18* (2006.01)
- *G06F 17/00* (2006.01)
- *G06N 5/00* (2006.01)

(52) U.S. Cl.
USPC .............................................. 706/12; 706/45

(58) Field of Classification Search
USPC ......................................................... 706/12
See application file for complete search history.

(56) References Cited

U.S. PATENT DOCUMENTS

| | | | |
|---|---|---|---|
| 4,827,428 A * | 5/1989 | Dunlop et al. | ................ 716/113 |
| 7,787,869 B2 | 8/2010 | Rice et al. | |
| 7,800,592 B2 | 9/2010 | Kerr et al. | |
| 2002/0099657 A1 | 7/2002 | Black et al. | |
| 2004/0125993 A1 | 7/2004 | Zhao et al. | |
| 2004/0137416 A1 | 7/2004 | Ma et al. | |
| 2006/0250213 A1 | 11/2006 | Cain, Jr. et al. | |
| 2007/0014536 A1 * | 1/2007 | Hellman | ......................... 386/94 |
| 2007/0073799 A1 | 3/2007 | Adjali et al. | |
| 2007/0079137 A1 | 4/2007 | Tu | |
| 2008/0004951 A1 | 1/2008 | Huang et al. | |
| 2008/0113787 A1 | 5/2008 | Alderucci et al. | |
| 2008/0128182 A1 | 6/2008 | Westerman et al. | |

(Continued)

FOREIGN PATENT DOCUMENTS

| | | |
|---|---|---|
| CN | 101651819 A | 2/2010 |
| EP | 2154882 A1 | 2/2010 |

(Continued)

OTHER PUBLICATIONS

Office Action Received for European Patent Application No. 09251950.3, mailed on Apr. 23, 2012, 3 pages.

(Continued)

*Primary Examiner* — Jeffrey A Gaffin
*Assistant Examiner* — Robert H Bejcek, II
(74) *Attorney, Agent, or Firm* — Garrett IP, LLC (57) ABSTRACT

Methods, systems and computer program products to allow a user to identify himself to a content provider, without having to explicitly perform a log in process or other identification and authentication process. By manipulating a user device such as a remote control, a profile of the user may be constructed, where the profile includes a representation of how the individual user typically manipulates the device. The profile includes a feature vector that is a function of the number of times that individual buttons are pressed. The construction of the feature vector may be viewed as a training or learning phase. Once the profile and feature vector are constructed, the user's interaction with the device in a subsequent session may be captured and compared with the profile. This may allow identification of the user, in turn allowing content to be tailored in a manner specific to this user.

15 Claims, 7 Drawing Sheets

(56) References Cited

U.S. PATENT DOCUMENTS

| | | |
|---|---|---|
| 2008/0168267 A1 | 7/2008 | Bolen et al. |
| 2008/0249969 A1 | 10/2008 | Tsui et al. |
| 2009/0117951 A1 | 5/2009 | Alameh et al. |
| 2010/0008643 A1* | 1/2010 | Rakib et al. ................ 386/68 |
| 2010/0042564 A1 | 2/2010 | Harrison et al. |

FOREIGN PATENT DOCUMENTS

| | | |
|---|---|---|
| WO | 2007/131069 A2 | 11/2007 |
| WO | 2010/019415 A2 | 2/2010 |
| WO | 2010/019415 A3 | 5/2010 |

OTHER PUBLICATIONS

Search report received for European Patent Application No. 09251950.3, mailed on Nov. 5, 2009, 3 pages.

Office Action Received for European Patent Application No. 09251950.3, mailed on Dec. 5, 2011, 4 pages.

Office Action Received for Chinese Patent application No. 200910170419.0, mailed on Jan. 6, 2012, 18 pages of Office Action Including 9 pages of English Translation.

International Search Report and Written Opinion received for International PCT Application No. PCT/US2009/052721 mailed on Mar. 23, 2010, 11 pages.

Office Action received for European Application No. 09251950.3, mailed on May 11, 2010, 5 pages.

Office Action received for Chinese Patent Application No. 200910170419.0, mailed on Sep. 7, 2011, 16 pages including 8 pages of English translation.

International Preliminary Report on Patentability and Written Opinion, received for International Patent Application No. PCT/US2009/052721, mailed on Feb. 24, 2011, 6 pages.

Office Action received for Chinese Patent Application No. 200910170419.0, mailed on Nov. 24, 2010, 10 pages of English Translation.

Office Action received for European Patent Application No. 09251950.3, mailed on Sep. 30, 2010, 6 pages.

Chang, K.; Hightower, J.; and Kveton, B. 2009. Inferring identity using accelerometers in television remote controls. In Proceedings of the 7th International Conference on Pervasive Computing, 151-167.

Ratliff, N.; Bagnell, A.; and Zinkevich, M. 2007. (Online) subgradient methods for structured prediction. In Proceedings of the 11th International Conference on Artificial Intelligence and Statistics.

Taskar, B.; Guestrin, C.; and Koller, D. 2004. Max-margin Markov networks. In Advances in Neural Information Processing Systems 16.

Office Action received for U.S. Appl. No. 12/192,789, mailed on Mar. 1, 2013. 20 pages.

* cited by examiner

AUTOMATIC USER IDENTIFICATION FROM BUTTON PRESSES RECORDED IN A FEATURE VECTOR

CROSS REFERENCE TO RELATED APPLICATIONS

This application is related to U.S. patent application Ser. No. 12/192,789, entitled "Techniques for Automatically Distinguishing Between Users of a Handheld Device" filed on Aug. 15, 2008.

BACKGROUND

Any given consumer may have access to a broad range of multimedia content, whether through broadcast television, subscription television, or the Internet. For a number of reasons it may be desirable to tailor content delivery for individual users. It would simplify the user experience, for example, if the range of possibilities were narrowed to channels and content that are consistent with the user's preferences. Such tailoring could also conserve bandwidth, memory, and other transmission and computing resources. Moreover, some content may not be appropriate for all users. Some content may be restricted to adults, for example, and should not be made available to children. Tailoring of content for children should reflect such considerations. In addition, media providers may wish to include advertising in the delivery of content. In this situation, advertising resources would be used more efficiently if the advertising were targeted to specific groups of users. For reasons such as these, tailoring content to specific users or to specific sets of users may be desirable.

In order to enjoy the benefits of such tailoring, the user typically needs to identify himself to the content provider when accessing content. This may take the form of logging in at the user's television or set-top box. A profile of the user can then be accessed, allowing for decisions to be made regarding the content to be provided to the user. Such an identification process may be cumbersome to the user. A typical user does not generally want to have to log in every time he sits down in front of the television or computer, for example. Such a process represents a burdensome extra step that must be performed before the user can access content.

BRIEF DESCRIPTION OF THE DRAWINGS/FIGURES

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

The system, method, and computer program product described herein may allow a user to identify himself to a content provider, without having to explicitly perform a log-in process or other deliberate self-identification process. By manipulating a user device, such as a remote control, a profile of the user may be constructed, where the profile may include a representation of how the individual user typically manipulates the device. The profile may include a feature vector that may be a function of the number of times that individual buttons are pressed by the user. The construction of the feature vector may be part of a training or learning phase. Once the feature vector is constructed, the user's interaction with the device in a subsequent session may be captured and compared with the profile. This may allow identification of the user, in turn allowing content to be tailored in a manner specific to this user.

Figure 1:
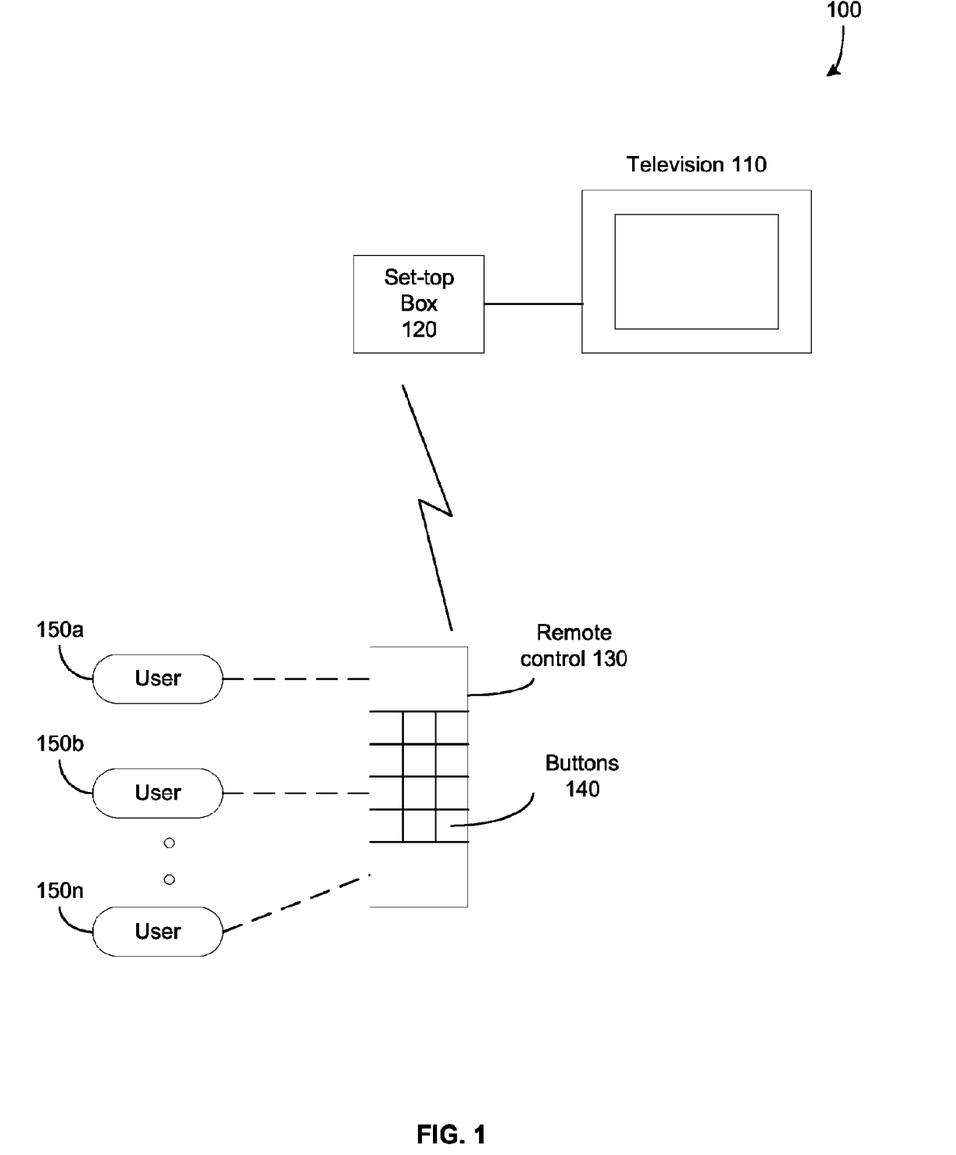
FIG. 1 is a block diagram of an exemplary environment in which the systems, methods and computer products described below may operate, according to an embodiment.

FIG. 1 illustrates an exemplary context in which such systems and methods may be implemented. A television 110 normally provides content to the user in this example. In other contexts, a computer or other device may be used to present content. In this illustration, television 110 may be connected to a set-top box (STB) 120. This latter device may serve as an interface through which the user may control viewing options. A remote control 130 may be used to receive input from the user and wirelessly send commands to the set-top box 120. In an alternative embodiment (not shown), a separate STB may not be present; instead, the logic that would otherwise be implemented in an STB may be present in the television. Here, the television may be thought of as a smart television. In this case, the remote control may communicate directly with the smart television.

The input may take the form of button presses as applied to an array of buttons 140. In a typical household, there may be more than one user. Here, the set of users is illustrated as users 150a through 150n. As will be described in greater detail below, the systems and methods described herein may capture a user's button presses on remote control 130 in training phase. This may be used to create a profile for the user, where the profile includes a feature vector that may be representative of the user's characteristic use of the remote control 130. In an embodiment, a profile may include multiple feature vectors, where each feature vector may represent a sample of the user's remote control usage. Other profiles may also be created for each of the other respective users. Subsequent to the training phase, the user's use of the remote control 130 may be compared to the stored profile of each user in the set of users 150, in order to determine the profile that is associated with the current user. This in turn may allow identification of the current user in a prediction phase.

Figure 2:
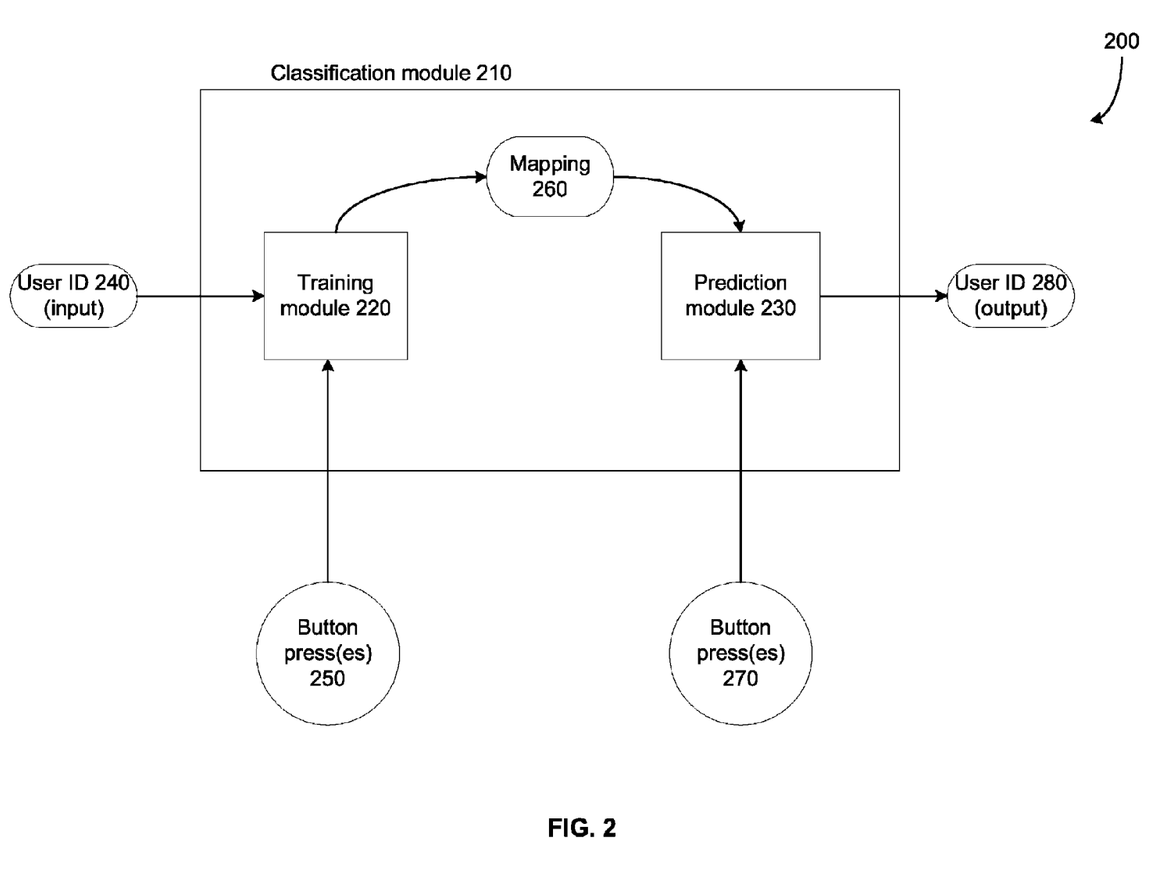
FIG. 2 is an exemplary block diagram illustrating the operation of the system and methods described herein, according to an embodiment.

The operation of the system and method described herein is illustrated generally in FIG. 2, according to an embodiment. A classification module 210 may include a training module 220 and a prediction module 230. During a training phase, one or more button presses 250 of a user may be captured. As will be described in greater detail below, button presses 250 may be used to create a feature vector for the profile, where the feature vector may represent a statistical summary of button presses 250. The user may also provide an identifier 240. This allows the training module 220 to associate the user with his profile. This association is shown as mapping 260 in the illustrated embodiment.

Mapping 260 may be provided to a prediction module 230. Profiles that are generated on behalf of additional users (not shown) may also be provided to prediction module 230. Subsequent to the training phase, one or more button presses 270 may be provided by the user during manipulation of the remote control. Button presses 270 may be provided in the course of operating the television and set-top box, for example. The prediction module 230 may process the button presses 270 and compare the result to the feature vectors of the respective profiles generated by training module 220 for the larger set of users. Prediction module 230 may then associate button presses 270 to a particular profile. The profile may be associated with a particular user, using mapping 260. The identity of this user is shown as user ID 280. This user ID 280 may then be used by the STB or the content provider to tailor the content that may be made available to the user associated with that user ID 280.

The classification, training, and prediction modules may be implemented in software, firmware, hardware, or any combination thereof. Moreover, these modules may be built into the user device, e.g., a remote control. Alternatively, these modules may be implemented in an STB, a cable headend, or elsewhere, provided that the classification module may receive information indicating button presses and/or other user inputs, and provide a user ID to a content provider or its proxy so as to allow tailoring of content delivery.

In an embodiment, the feature vector may be implemented as follows. The feature vector may be n-dimensional, where n may correspond to the number of buttons on the user device. If the user device is a remote control and there are n buttons on the remote control, then the feature vector may be n-long. The number of sessions that have taken place may be represented by an index last-session. Sessions may be defined as intervals in which significant remote control activity (e.g., button presses) takes place, separated by time intervals of no activity. Another n-dimensional vector may be used, button_cum_vec. Each value button_cum_vec[i] in this vector may represent the cumulative count of the number of times that button i has been pressed. The feature vector may then be expressed as $$\log((\text{float})(\text{last\_session}+2)/(\text{button\_cum\_vec}[i]+1))$$

for each i, $0 \le i \le n$.
Note that each value in the feature vector may be seen as an inverse frequency of the number of button presses of button i in relation to the number of sessions.

Figure 3:
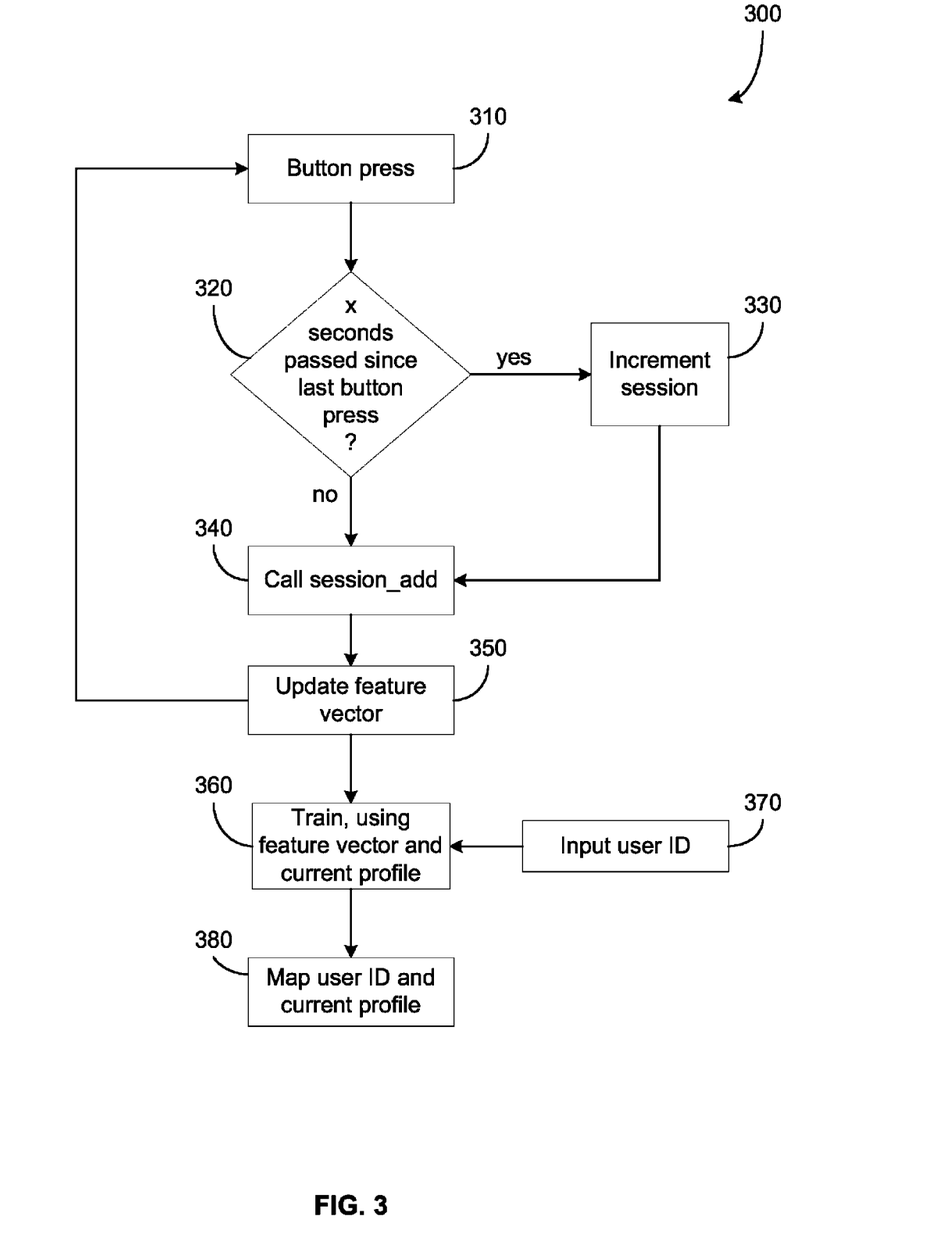
FIG. 3 is a flowchart illustrating the operation of a training module, according to an embodiment.

Training is illustrated in FIG. 3, according to an embodiment. At 310, a button push may be received by the training module. At 320, a determination may be made as to whether a predetermined amount of time has passed since the previous button press. If so, then it may be assumed that the user is now in a new session with the user device. At 330, a session counter may be incremented to reflect this new session. At 340, a routine may be called or otherwise performed to record the button press of 310. In this figure, this routine is shown as "session-add." In addition, other data structures may be updated depending on whether or not the current session is a new session, as will be described in greater detail below. At 350, the feature vector may be updated as a result of the button press at 310. 310 through 350 may be repeated until sufficient data is collected to allow training to take place.

At 360, training may take place using the feature vector and current profile of the user that corresponds to the user ID as presented at 370. At 380, the user ID and the current profile may be associated, if this has not already taken place.

As is known to persons of ordinary skill in the art, a number of training algorithms may be used. In an embodiment, a support vector machine (SVM) may be used. Such learning may take the form of max-margin learning, and may be supervised or semi-supervised. Moreover, online max-margin learning may be used, where such online learning may be formulated as an online convex programming process.

Figure 4:
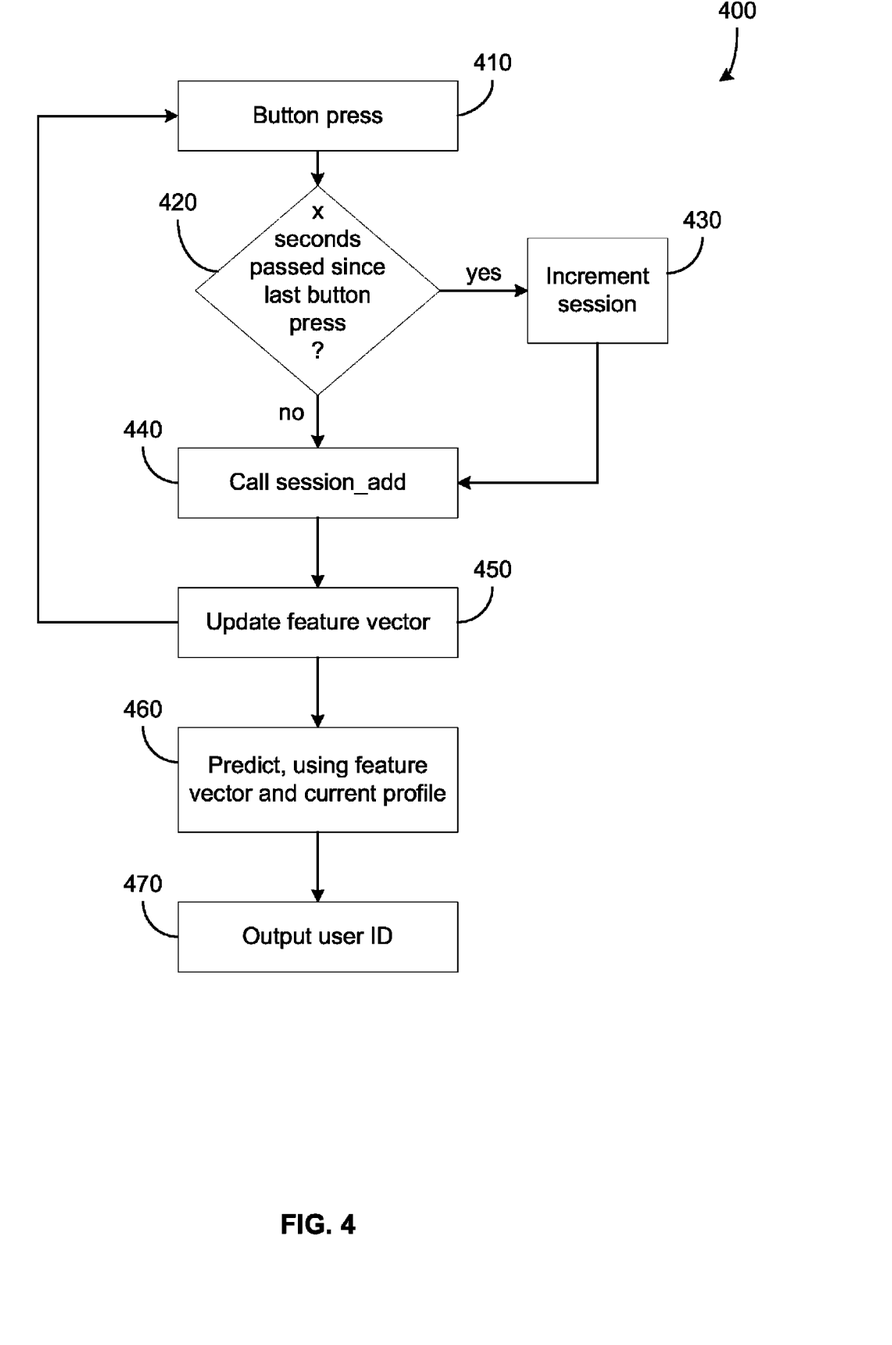
FIG. 4 is a flowchart illustrating the operation of a prediction module, according to an embodiment.

Prediction is illustrated in FIG. 4, according to an embodiment. At 410, a button push may be received by the training module. At 420, a determination may be made as to whether a predetermined amount of time has passed since the previous button press. If so, then it may be assumed that the user is now in a new session with the user device. At 430, a session counter may be incremented to reflect this new session. At 440, "session-add" may be called or otherwise performed. At 450, a feature vector may be created or otherwise updated as a result of the button press at 410. 410 through 450 may be repeated as necessary until enough data is collected to enable prediction.

At 460, prediction may take place using the updated feature vector. In an embodiment, this feature vector may be compared to feature vectors of possible users as generated previously during their respective training phases. The previous feature vector that most closely resembles the current feature vector may then be identified. A number of statistical tests may be used to determine the degree of resemblance between a current feature vector and previous feature vectors, as would be known to a person of ordinary skill in the art. A mapping of users and their respective profiles (including their respective previous feature vectors) may then be used to identify or predict the particular user. The ID of this user may be output at 470.

Figure 5:
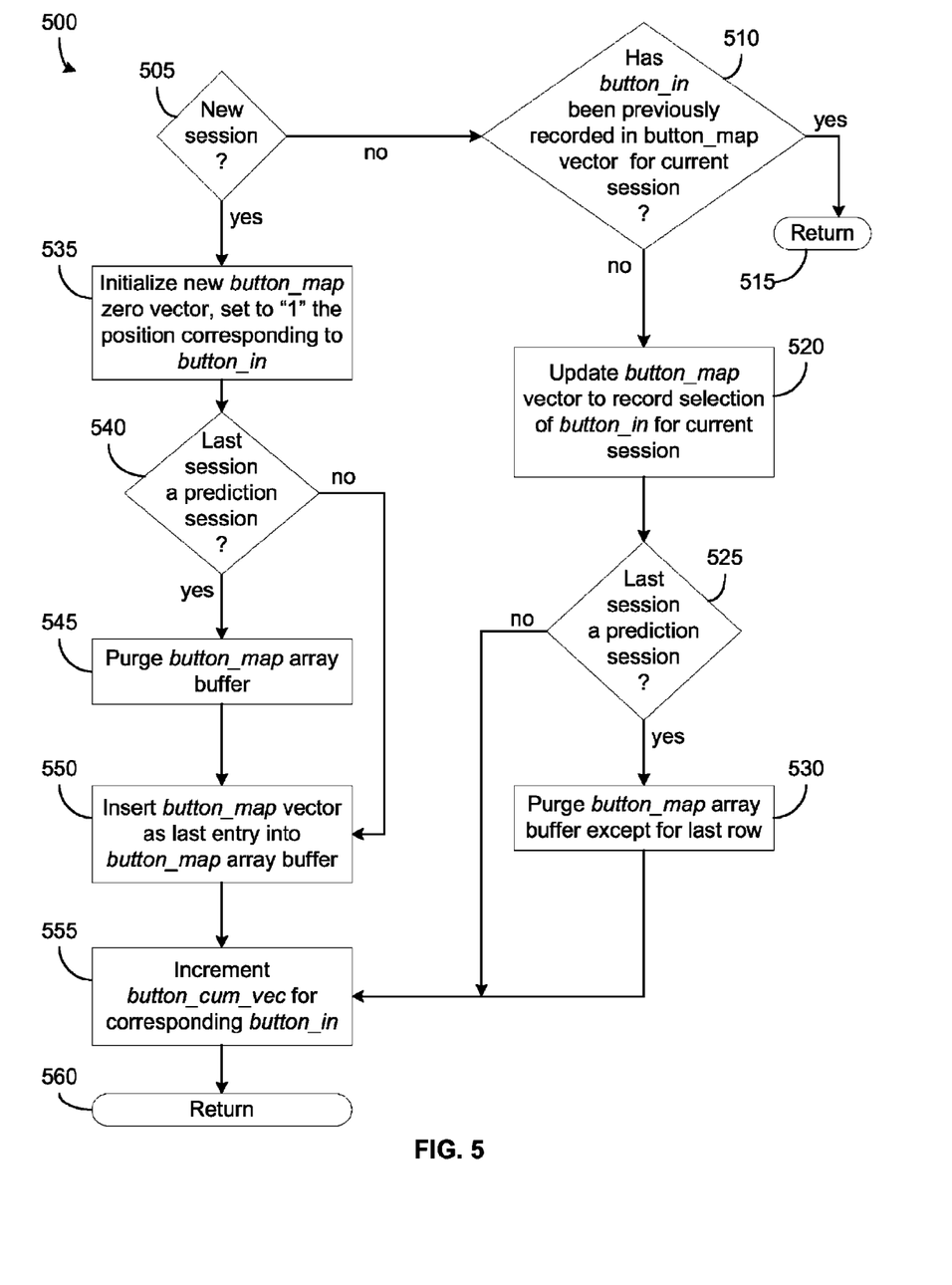
FIG. 5 is a flowchart illustrating the logging of button presses, according to an embodiment.

An example of a session-add routine is illustrated in FIG. 5, according to an embodiment. This routine may update the vector button_cum_vec as necessary, depending on whether the current session is a new session, and depending on whether the previous session was a prediction session or a training session. At 505, a determination may be made as to whether the current session represents a new session. If not, the process may continue at 510. Here, a determination may be made as to whether button_in has been previously recorded in the vector button_map for the current session. The variable button_in may represent the button last pressed by the user, and the vector button_map may be an n-dimensional vector, where each value button_map [i] represents the number of times that button i has been pressed. If button_in has been previously recorded in the vector button_map for the current session, then the process may conclude at 515. Otherwise, the process may continue at 520, where the vector button_map may be updated to record the selection of button_in for the current session.

At 525, a determination may be made as to whether the last session was a prediction session, where the button presses of that session were used to determine the identity of a user. If not, then the last session was a training session, and the process may continue to 555. Here button_cum_vec[i] may be incremented where button_in represents the ith button. If, at 525, it is determined that the last session was a prediction session, then at 530 the array buffer button_map may be purged, except for the last row. This array buffer may be used to store previous instances of the vector button_map. The process may then continue to 555, where button_cum_vec[i] may be incremented.

Returning to 505, if it is determined that the current session is a new session, then at 535 a new button_map vector may be initialized to all 0's, except that button_map [i] may be set to 1 where button_in represents the ith button. At 540 a determination may be made as to whether the last session was a prediction session. If not, then the process may continue at 550, where the newly created button_map vector may be inserted into the button_map array buffer as the last entry. If it is determined at 540 that the last session was a prediction session, then the process continues at 545. Here, the button_map array buffer may be cleared. Then at 550 the newly created button_map vector may be inserted into the button_map array buffer as the last entry. At 555, button_cum_vec[i] may be incremented where button_in represents the ith button.

Figure 6:
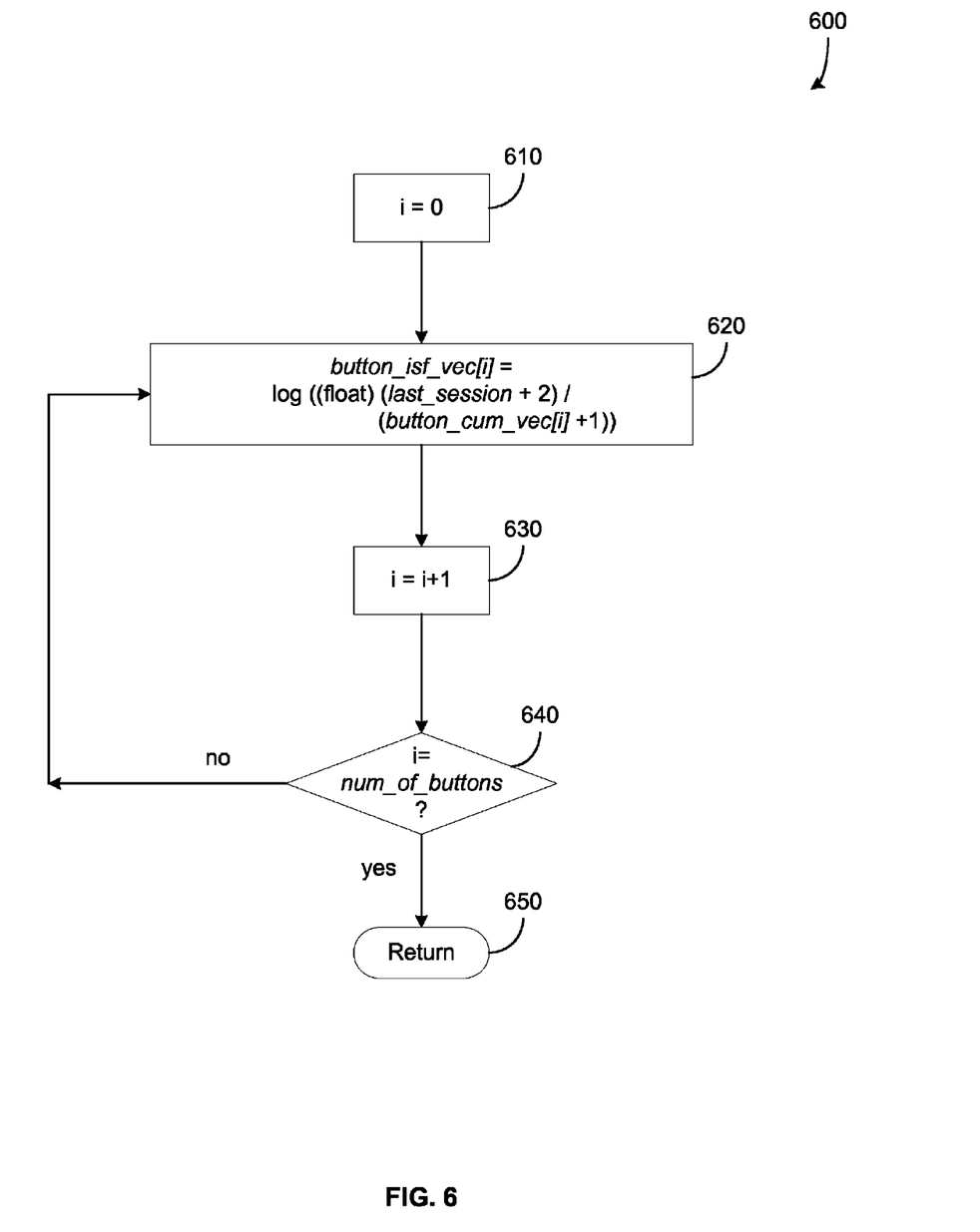
FIG. 6 is a flowchart illustrating the construction of a feature vector, according to an embodiment.

The creation of a feature vector is illustrated in FIG. 6, according to an embodiment. The feature vector is shown here as button_isf_vec. At 610, an index i may be initialized to 0. At 620, the ith entry of the feature vector may be calculated, $$\text{button\_isf\_vec}[i] = \log((\text{float})(\text{last\_session}+2)/(\text{button\_cum\_vec}[i]+1)).$$

At 630, the index i may be incremented. At 640 it may be determined whether the value of i has reached the number of buttons. If not, then the process may return to 620 for calculation of the next value in button_isf_vec. The process may conclude at 650.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, a hard disk, or other data storage device.

Figure 7:
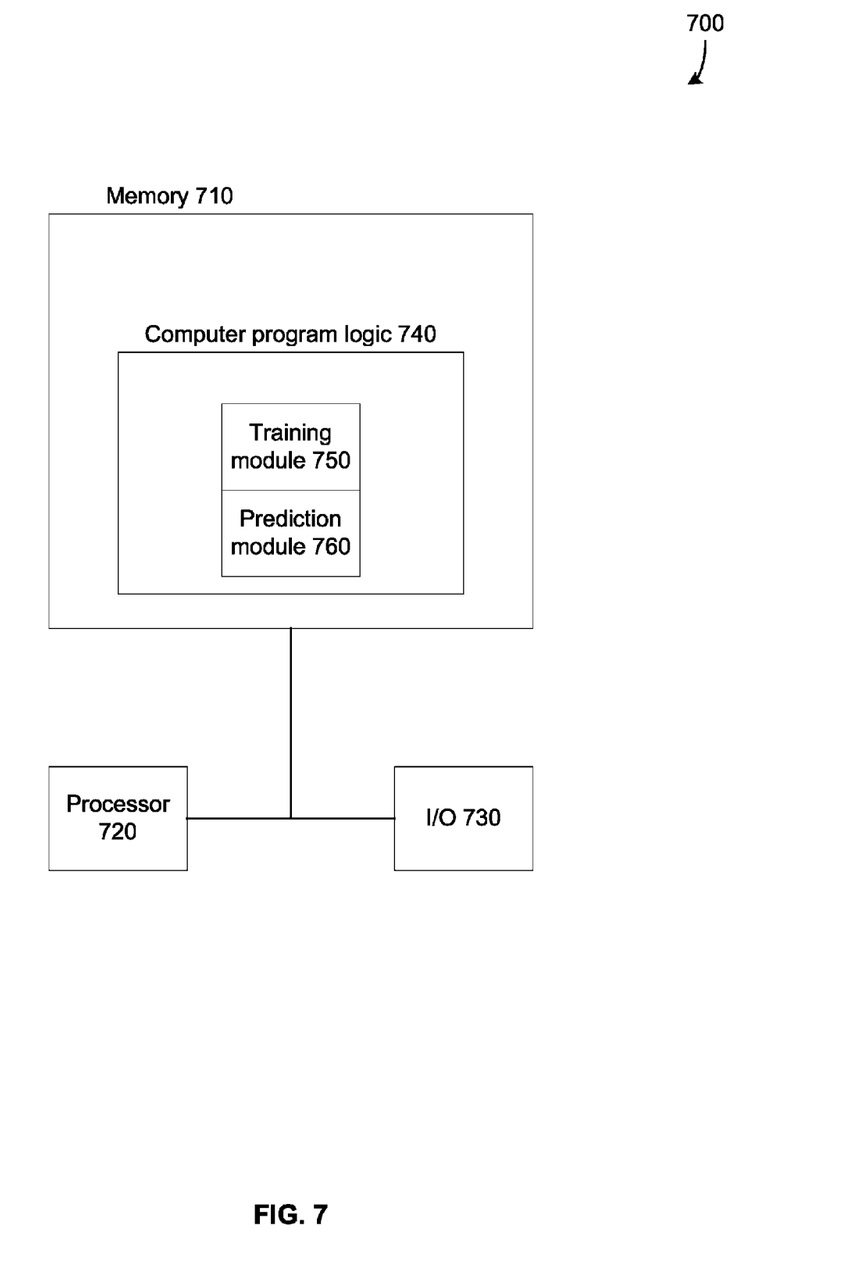
FIG. 7 is a block diagram illustrating an exemplary computing environment of the system described herein, according to an embodiment.

A software or firmware embodiment of the processing described above with reference to FIGS. 3-6 is illustrated in FIG. 7. System 700 may include a programmable processor 720 and a body of memory 710 that may include one or more computer readable media that store computer program logic 740. Memory 710 may be implemented as one or more of a hard disk and drive, a removable media such as a compact disk and drive, flash memory, or a random access (RAM) or read-only memory (ROM) device, for example. Processor 720 and memory 710 may be in communication using any of several technologies known to one of ordinary skill in the art, such as a bus. Processor 720 may be a special purpose processor or a general purpose processor. Logic contained in memory 710 may be read and executed by processor 720. One or more I/O ports and/or I/O devices, shown collectively as I/O 730, may also be connected to processor 720 and memory 710. In an embodiment, computer program logic 740 may include the logic modules 750 and 760. Training module 750 may implement the logic shown in FIGS. 3, 5, and 6 and described in the accompanying text, for example. Prediction module 760 may implement the logic illustrated in FIGS. 4-6 and described in the accompanying text. As noted above, the embodiment shown in FIG. 7 may be implemented in a user device such as a remote control, an STB, or other component.

In one embodiment, for example, a device that implements the system, method, and/or computer program product described herein may comprise a processing system, computing system, mobile computing system, mobile computing device, mobile wireless device, computer, computer platform, computer system, computer sub-system, server, workstation, terminal, personal computer (PC), laptop computer, ultra-laptop computer, portable computer, handheld computer, personal digital assistant (PDA), cellular telephone, combination cellular telephone/PDA, smart phone,(e.g., a Blackberry® device), pager, one-way pager, two-way pager, messaging device, MID, MP3 player, and so forth. The embodiments are not limited in this context.

In one embodiment, such a device may be implemented as part of a wired communication system, a wireless communication system, or a combination of both. In one embodiment, for example, such a device may be implemented as a mobile computing device having wireless capabilities. A mobile computing device may refer to any device having a processing system and a mobile power source or supply, such as one or more batteries, for example. Examples of such a mobile computing device may include a laptop computer, ultra-mobile PC, portable computer, handheld computer, palmtop computer, personal digital assistant (PDA), cellular telephone, combination cellular telephone/PDA, smart phone, pager, one-way pager, two-way pager, messaging device, data communication device, MID, MP3 player, and so forth.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:
1. A method, comprising:
  receiving a user identifier at a user device;
  training the device by constructing a profile of the user associated with the user identifier, wherein the profile comprises a feature vector that is a function of the user's pressing of buttons on the device, the function represented by

$$\text{button\_isf\_vec}[i] = \log((\text{float})(\text{last}_{13}\text{session}+2)/(\text{button\_cum\_vec}[i]+1))$$

where
    button_isf_vec is the feature vector,
    i is the index of the feature vector, such that $0 \leq i <$ the number of buttons on the device, last_session is an index referring to the number of sessions that the user has spent interacting with the device, and button_cum vec[i] is the number of times that the user has pressed the ith button of the device, where the function incorporates an inverse frequency of the presses of each button;

associating the profile with the user identifier; and subsequent to said training, predicting the user identifier, given one or more instances of the user's pressing of buttons on the device, given the profile, and given the association of the profile with the user identifier.

2. The method of claim 1, wherein the device comprises a remote control.

3. The method of claim 1, wherein said predicting identifies the user identifier from among a plurality of other identifiers associated with a respective plurality of other users.

4. The method of claim 1, wherein said training comprises operation of a support vector machine.

5. The method of claim 4, wherein said operation comprises on-line convex programming.

6. A system, comprising:

a processor; and a memory in communication with said processor, wherein said memory stores a plurality of processing instructions configured to direct said processor to receive a user identifier at a user device;

train the device by constructing a profile of the user associated with the user identifier, wherein the profile comprises a feature vector that is a function of the user's pressing of buttons on the device, the function represented by $$\text{button\_isf\_vec}[i] = \log((\text{float})(\text{last}_{13}\text{session}+2)/(\text{button\_cum\_vec}[i]+1))$$

where button_isf_vec is the feature vector, i is the index of the feature vector, such that $0 \leq i <$ the number of buttons on the device, last_session is an index referring to the number of sessions that the user has spent interacting with the device, and button_cum_vec[i] is the number of times that the user has pressed the ith button of the device, where the function incorporates an inverse frequency of the presses of each button;

associate the profile with the user identifier; and subsequent to said training, predict the user identifier, given one or more instances of the user's pressing of buttons on the device, given the profile, and given the association of the profile with the user identifier.

7. The system of claim 6, wherein the device comprises a remote control.

8. The system of claim 6, wherein said processing instructions configured to direct said processor to predict comprise:

processing instructions configured to direct said processor to identify the user identifier from among a plurality of other identifiers associated with a respective plurality of other users.

9. The system of claim 6, wherein said processing instructions configured to direct said processor to train comprise:

processing instructions configured to direct said processor to operate a support vector machine.

10. The system of claim 9, wherein said processing instructions configured to direct said processor to operate the support vector machine comprise:

processing instructions configured to direct said processor to perform on-line convex programming.

11. A computer program product including a non-transitory computer readable medium having computer program logic stored therein, the computer program logic comprising:

logic to cause a processor to receive a user identifier at a user device;

logic to cause the processor to train the device by constructing a profile of the user associated with the user identifier, wherein the profile comprises a feature vector that is a function of the user's pressing of buttons on the device, the function represented by $$\text{button\_isf\_vec}[i] = \log((\text{float})(\text{last}_{13}\text{session}+2)/(\text{button\_cum\_vec}[i]+1))$$

where button_isf_vec is the feature vector, i is the index of the feature vector, such that $0 \leq i <$ the number of buttons on the device, $\text{last}_{13}$session is an index referring to the number of sessions that the user has spent interacting with the device, and button_cum_vec[i] is the number of times that the user has pressed the ith button of the device, where the function incorporates an inverse frequency of the presses of each button;

logic to cause the processor to associate the profile with the user identifier; and logic to cause the processor to predict the user identifier, subsequent to said training, given one or more instances of the user's pressing of buttons on the device, given the profile, and given the association of the profile with the user identifier.

12. The computer program product of claim 11, wherein the device comprises a remote control.

13. The computer program product of claim 11, wherein said logic to cause the processor to predict comprises:

logic to cause the processor to identify the user identifier from among a plurality of other identifiers associated with a respective plurality of other users.

14. The computer program product of claim 11, wherein said logic to cause the processor to train comprises:

logic to cause the processor to operate a support vector machine.

15. The computer program product of claim 14, wherein said logic to cause the processor to operate the support vector machine comprises:

logic to cause the processor to perform on-line convex programming.

* * * * *

UNITED STATES PATENT AND TRADEMARK OFFICE
CERTIFICATE OF CORRECTION

PATENT NO. : 8,630,963 B2  
APPLICATION NO. : 13/175603  
DATED : January 14, 2014  
INVENTOR(S) : Mariano J. Phielipp et al.

Page 1 of 1

It is certified that error appears in the above-identified patent and that said Letters Patent is hereby corrected as shown below:

In the Claims:

In column 6, line 62, in claim 1, delete "(last 13 session+2)" and insert -- (last_session+2) --, therefor.

In column 6, line 65, in claim 1, delete "button _isf" and insert -- button_isf --, therefor.

In column 7, line 3, in claim 1, delete "button_cum vec[i]" and insert -- button_cum_vec[i] --, therefor.

In column 7, line 32, in claim 6, delete "(last13 session+2)" and insert -- (last_session+2) --, therefor.

In column 8, line 21, in claim 11, delete "(last13 session+2)" and insert -- (last_session+2) --, therefor.

In column 8, line 27, in claim 11, delete "last13session" and insert -- last_session --, therefor.

Signed and Sealed this  
Twenty-fourth Day of June, 2014

Michelle K. Lee  
*Deputy Director of the United States Patent and Trademark Office*